US012756631B2

(12) United States Patent
(10) Patent No.: US 12,756,631 B2
(45) Date of Patent: Oct. 6, 2026
Shih et al.

(54) METHOD FOR UPDATING NETWORK TOPOLOGY AND CONTROL NODE

(71) Applicant: Moxa Inc., New Taipei City (TW)

(72) Inventors: Fu-Jen Shih, New Taipei City (TW); Cheng-Tsung Hung, New Taipei City (TW); Chia-Ching Lu, New Taipei City (TW)

(73) Assignee: Moxa Inc., New Taipei City (TW)

( * ) Notice: Subject to any disclaimer, the term of this patent is extended or adjusted under 35 U.S.C. 154(b) by 317 days.

(21) Appl. No.: 18/404,911

(22) Filed: Jan. 5, 2024

(65) Prior Publication Data

US 2025/0184225 A1 Jun. 5, 2025

(30) Foreign Application Priority Data

Nov. 30, 2023 (TW) ................................ 112146520

(51) Int. Cl.
*H04W 40/24* (2009.01)
*H04L 41/12* (2022.01)

(52) U.S. Cl.
CPC ........... *H04L 41/12* (2013.01); *H04W 40/246* (2013.01)

(58) Field of Classification Search
CPC ............................ H04L 41/12; H04W 40/246
See application file for complete search history.

(56) References Cited

U.S. PATENT DOCUMENTS 7,653,011 B2 1/2010 Rahman et al.
11,700,565 B2 7/2023 Hampel et al.
2004/0003111 A1 1/2004 Maeda et al.
2004/0120330 A1* 6/2004 Rhine .................... H04L 12/44 370/408
2006/0199530 A1 9/2006 Kawasaki
2006/0227724 A1* 10/2006 Thubert ................. H04L 45/48 370/254
2006/0268908 A1* 11/2006 Wang .................... H04L 47/762 370/401
2006/0280131 A1* 12/2006 Rahman ................ H04L 45/123 370/256
2008/0080401 A1* 4/2008 Ribiere ................. H04L 45/025 370/256

(Continued)

FOREIGN PATENT DOCUMENTS

CN 103974310 A * 8/2014
CN 104410985 3/2015

(Continued)

OTHER PUBLICATIONS

Huawei et al., "Enhanced support for ubiquitous emergency services in Rel-19", 3GPP TSG-RAN Meeting #101, RP-232125, Sep. 11-15, 2023, pp. 1-6.

(Continued)

*Primary Examiner* — Fahmida S Chowdhury
(74) *Attorney, Agent, or Firm* — JCIPRNET

(57) ABSTRACT

Embodiments of the disclosure provide a method for updating a network topology and a control node. The method includes: establishing a tree network topology including multiple network nodes; obtaining a signal scanning results of each of the network nodes; and updating the tree network topology based on a signal scan result of the each of the network nodes.

20 Claims, 20 Drawing Sheets

(56) References Cited

U.S. PATENT DOCUMENTS

| | | | | |
|---|---|---|---|---|
| 2009/0322518 | A1* | 12/2009 | Liang | H04W 24/02 340/539.18 |
| 2010/0188971 | A1 | 7/2010 | Chiang | |
| 2011/0176459 | A1* | 7/2011 | Patel | H04W 72/535 370/256 |
| 2011/0267982 | A1* | 11/2011 | Zhang | H04B 7/2606 370/256 |
| 2013/0259035 | A1* | 10/2013 | Chen | H04L 12/4641 370/389 |
| 2014/0082116 | A1* | 3/2014 | Sasaki | H04L 12/40006 709/208 |
| 2015/0156070 | A1* | 6/2015 | Gidlund | H04L 41/0853 370/254 |
| 2016/0302079 | A1 | 10/2016 | Chari et al. | |
| 2017/0055131 | A1* | 2/2017 | Kong | H04W 4/027 |
| 2017/0078985 | A1* | 3/2017 | Zheng | H04J 3/0641 |
| 2017/0126841 | A1* | 5/2017 | Bliss | G05B 19/0423 |
| 2018/0279179 | A1* | 9/2018 | Norlén | H04L 41/0859 |
| 2018/0302294 | A1* | 10/2018 | Diancin | H04W 24/04 |
| 2020/0092784 | A1 | 3/2020 | Hampel et al. | |
| 2020/0092791 | A1* | 3/2020 | Arvidson | H04W 40/246 |
| 2020/0100124 | A1* | 3/2020 | Hampel | H04W 24/02 |
| 2020/0170074 | A1 | 5/2020 | Klausen et al. | |
| 2021/0014770 | A1* | 1/2021 | Qi | H04B 17/318 |
| 2021/0234671 | A1* | 7/2021 | Solan | G06F 16/2246 |
| 2022/0272614 | A1* | 8/2022 | Lu | H04L 41/12 |
| 2022/0304007 | A1* | 9/2022 | Jabandzic | H04W 72/535 |
| 2022/0394588 | A1* | 12/2022 | Park | H04L 45/122 |
| 2023/0135534 | A1 | 5/2023 | Schlegel et al. | |
| 2023/0239666 | A1* | 7/2023 | Nagakubo | H04W 4/38 370/328 |
| 2023/0379790 | A1 | 11/2023 | Furukawa | |
| 2024/0031907 | A1* | 1/2024 | Liu | H04L 67/12 |
| 2024/0202178 | A1* | 6/2024 | Meister | G06F 16/2246 |
| 2025/0063462 | A1 | 2/2025 | Baudia | |
| 2025/0184225 | A1* | 6/2025 | Shih | H04W 40/22 |

FOREIGN PATENT DOCUMENTS

| | | |
|---|---|---|
| CN | 106454997 | 2/2017 |
| CN | 106658635 | 5/2017 |
| CN | 103974310 | 6/2017 |
| CN | 110149671 | 8/2019 |
| CN | 112740819 | 4/2021 |
| CN | 113056946 | 6/2021 |
| CN | 114390487 | 4/2022 |
| CN | 114500133 | 5/2022 |
| CN | 114615678 | 6/2022 |
| CN | 116033516 | 4/2023 |
| CN | 116056180 | 5/2023 |
| EP | 3629658 | 4/2020 |
| TW | I619403 | 3/2018 |
| TW | 202226882 | 7/2022 |
| WO | 2023108231 | 6/2023 |

OTHER PUBLICATIONS

"Office Action of Australia Related Application, Application No. 2024200891", issued on Oct. 28, 2024, p. 1-p. 9.

"Search Report of Europe Counterpart Application", issued on Jul. 17, 2024, p. 1-p. 8.

"Search Report of Europe Related Application, Application No. 24162863.5", issued on Aug. 7, 2024, p. 1-p. 8.

"Office Action of Taiwan Counterpart Application", issued on Jun. 14, 2024, p. 1-p. 5.

"Office Action of Taiwan Related Application, Application No. 112146521", issued on Apr. 9, 2024, p. 1-p. 11.

"Office Action of Canada Related Application, Application No. 3,230,562", issued on Apr. 29, 2025, p. 1-p. 4.

"Office Action of Australia Counterpart Application", issued on May 16, 2025, p. 1-p. 7.

"Office Action of Australia Counterpart Application", issued on Feb. 5, 2025, p. 1-p. 7.

"Office Action of Canada Counterpart Application", issued on Feb. 28, 2025, p. 1-p. 4.

"Office Action of U.S. Appl. No. 18/404,919", issued on Jan. 9, 2026, pp. 1-54.

* cited by examiner

METHOD FOR UPDATING NETWORK TOPOLOGY AND CONTROL NODE

CROSS-REFERENCE TO RELATED APPLICATION

This application claims the priority benefit of Taiwan application serial no. 112146520, filed on Nov. 30, 2023. The entirety of the above-mentioned patent application is hereby incorporated by reference herein and made a part of this specification.

BACKGROUND

Technical Field

This disclosure relates to a technology for determining network topology, and in particular to a method for updating tree network topology and a control node.

Description of Related Art

In the environment of multi-hop wireless network, especially in industrial environments, the wireless environment is usually very complex and full of interference. Therefore, in such cases, building a tree network topology is usually more challenging than building a star network topology.

In a star network topology, all nodes communicate directly with a central hub, which simplifies network management and reduces interference. In contrast, since a tree network topology involves a hierarchical structure formed by multiple interconnected nodes, establishing and maintaining such a hierarchical structure may be more complex. Also, interference in the network may affect the reliability of multi-hop connections.

SUMMARY

The disclosure provides a method for updating a tree network topology and a control node, which may be used to solve the above technical problems.

The embodiment of the disclosure provides a method for updating a network topology, executed by a control node of multiple network nodes. The method includes the following. A tree network topology including the network nodes is established. A signal scan result of each of the network nodes is obtained, where the signal scan result of the each of the network nodes indicates a signal quality indicator of at least one other network node. The tree network topology is updated based on the signal scan result of the each of the network nodes.

The embodiment of the disclosure provides a control node including a storage circuit and a processor. The storage circuit stores a program code. The processor is coupled to the storage circuit and accesses the program code to: establish a tree network topology including multiple network nodes; obtain a signal scan result of each of the network nodes, where the signal scan result of the each of the network nodes indicates a signal quality indicator of at least one other network node; and update the tree network topology based on the signal scan result of the each of the network nodes.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
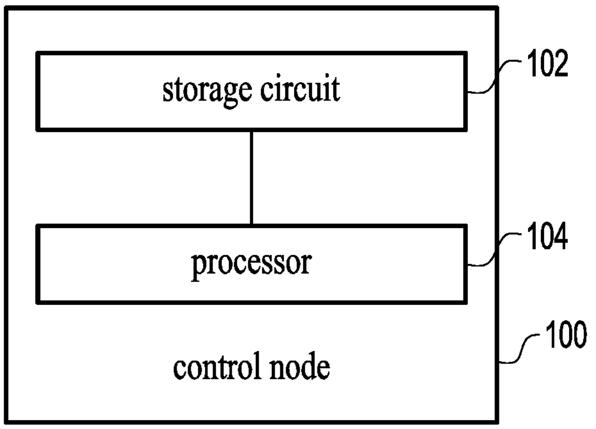
FIG. 1 is a schematic diagram of a control node according to an embodiment of the disclosure.

FIG. 1 is a schematic diagram of a control node according to an embodiment of the disclosure. In different embodiments, a control node 100 may be implemented as, for example, various smart devices and/or computer devices, but is not limited thereto. In some embodiments, the control node 100 may belong to, for example, a multi-hop wireless network system including multiple network nodes.

In one embodiment, the control node 100 is, for example, a multi-point relay (MPR) of the network nodes, and may be used to manage one or more member nodes in the multi-hop wireless network system. Each of the member nodes is, for example, a network node other than the control node 100.

In some embodiments, the one or more member nodes are, for example, mesh access point (MAP) in a multi-hop wireless network system. In addition, in one embodiment, the each of the member nodes is connected to the external network only through the control node 100. The external network includes, for example, control centers such as supervisory control and data acquisition systems, but is not limited thereto.

In different embodiments, the control node 100 may be predefined, or determined by the multiple network nodes through a specific competition mechanism, but is not limited thereto.

In FIG. 1, the control node 100 includes a storage circuit 102 and a processor 104.

The storage circuit 102 is, for example, any type of fixed or removable random access memory (RAM), read-only memory (ROM), flash memory, hardware disc, other similar device, or a combination of these devices, that can be used to record multiple codes or modules.

The processor 104 is coupled to the storage circuit 102, and can be a general purpose processor, a special purpose processor, a conventional processor, a digital signal processor, multiple microprocessors, one or more combined digital signal processing microprocessor, controller, microcontroller, application specific integrated circuit (ASIC), field programmable gate array (FPGA), any other type of integrated circuits, state machines, processors based on advanced RISC machine (ARM), and the like. In the embodiment of the disclosure, each of the network nodes may have the same or similar structure.

In the embodiment of the disclosure, the processor 104 can access modules and program codes recorded in the storage circuit 102 to implement a method for updating a network topology proposed by the disclosure, the details of which are detailed below.

Figure 2:
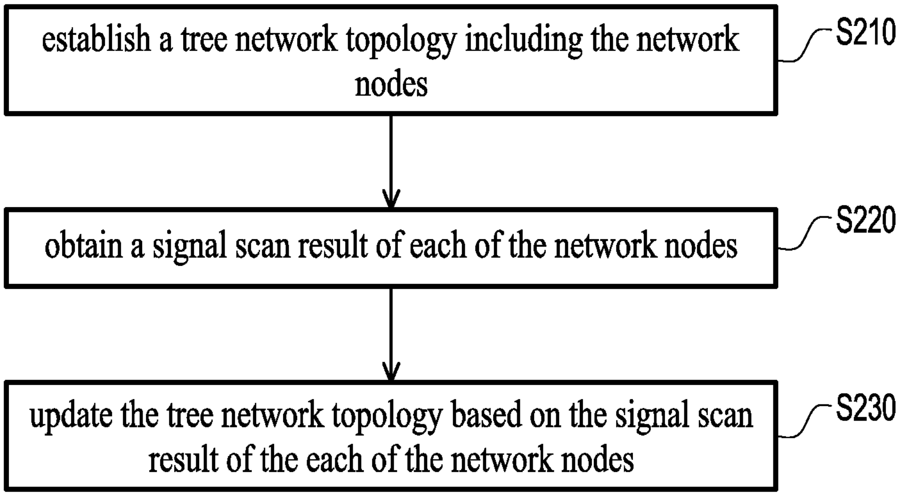
FIG. 2 is a flow chart of a method for updating a network topology according to an embodiment of the disclosure.

FIG. 2 is a flow chart of a method for updating a network topology according to an embodiment of the disclosure. The method in this embodiment may be executed by the control node 100 in FIG. 1. The details of each step in FIG. 2 will be explained below with the components shown in FIG. 1.

In step S210, the processor 104 establishes a tree network topology including the network nodes. In different embodiments, the processor 104 and other member nodes may establish an initial tree network topology based on any conventional algorithm for establishing network topology.

Figure 3:
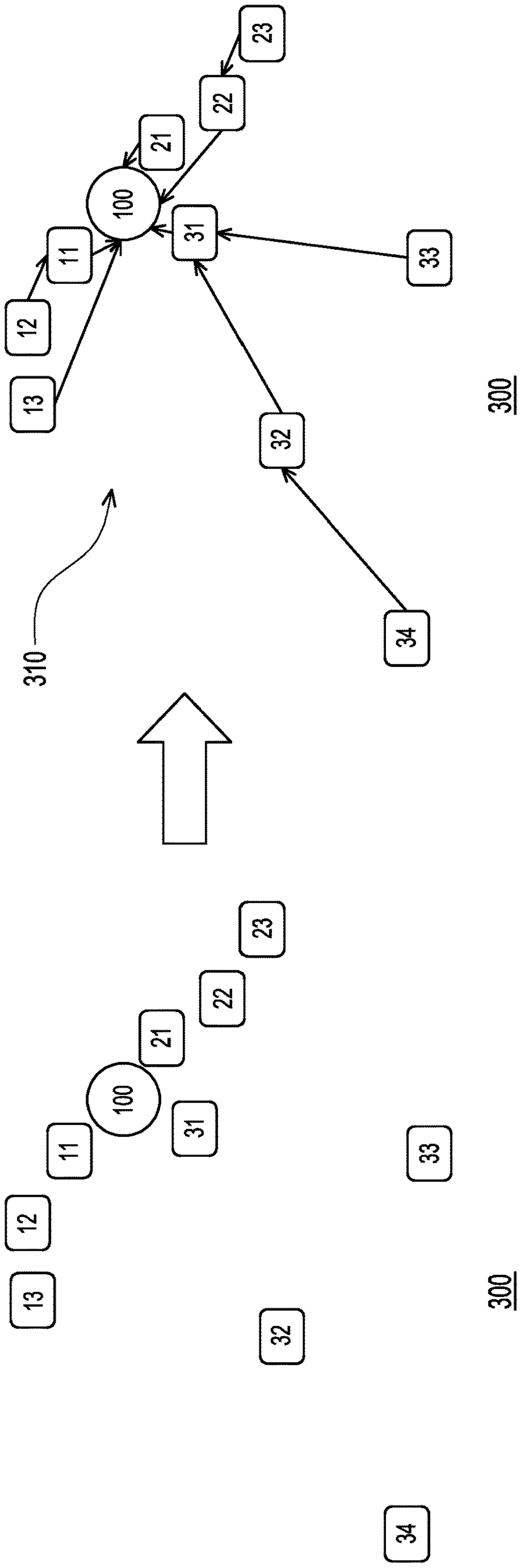
FIG. 3 is a schematic diagram of establishing an initial tree network topology according to an embodiment of the disclosure.

FIG. 3 is a schematic diagram of establishing an initial tree network topology according to an embodiment of the disclosure.

In FIG. 3, it is assumed that a multi-hop wireless network system 300 includes the control node 100 (e.g., MPR) and member nodes 11, 12, 13, 21, 22, 23, 31, 32, 33, and 34 (e.g., MAP) and other network nodes, and the control node 100 and each of the member nodes shown may establish an initial tree network topology 310 based on a certain known algorithm.

As can be seen from FIG. 3, each of the member nodes in the tree network topology 310 may be directly connected to the control node 100, or indirectly connected to the control node 100 through other member nodes. For example, the member nodes 11, 13, 21, 22, and 31 may be directly connected to the control node 100.

In addition, the member nodes 12, 23, 32, 33, and 34 may be indirectly connected to the control node 100 through other member nodes. For example, the member node 12 may be indirectly connected to the control node 100 through the member node 11. In this case, the member node 11 may be regarded as a relay node of the member node 12. Alternatively, the member node 11 can also be called a parent node of the member node 12, and the member node 12 can be called a child node of the member node 11.

In one embodiment, the member node 11 may connect to a wireless terminal interface of the member node 12 through its own access point interface to operate as a relay node and/or parent node of the member node 12. From another point of view, the member node 12 may operate as a wireless terminal served by the member node 11, and the member node 11 may provide an access point function and operate as an access point serving the member node 12. That is, a child node may operate as a wireless terminal served by a parent node, and the parent node may operate as an access point serving the child node.

As another example, the member node 23 may be indirectly connected to the control node 100 through the member node 22. In this case, the member node 22 may be regarded as the relay node of the member node 23. Alternatively, the member node 22 can also be called the parent node of the member node 23, and the member node 23 can be called the child node of the member node 22.

In one embodiment, the member node 22 may connect to a wireless terminal interface of the member node 23 through its own access point interface to operate as a relay node and/or parent node of the member node 23. From another point of view, the member node 23 may operate as a wireless terminal served by the member node 22, and the member node 22 may provide an access point function and operate as an access point serving the member node 23.

In addition, a member node that operates as a child node may also operate as a relay node (i.e., a parent node) of other member nodes. For example, the member node 32, in addition to operating as a child node of the member node 31, may also operate as a relay node (i.e., a parent node) of the member node 34.

However, some member nodes in FIG. 3 may be connected to the control node 100 using a lower quality and/or unreliable method of transmission due to the content of the algorithms used. For example, although the member nodes 13 and 22 are far away from the control node 100, they are configured to be directly connected to the control node 100 in the tree network topology 310 established based on the known algorithm. In this case, the member nodes 13 and 22 may not be able to achieve better transmission quality and/or reliability.

Based on this, the control node 100 may update the tree network topology 310 through subsequent steps S220 and S230 to adjust the connection method between the member nodes 13, 22 and/or other member nodes and the control node 100, thereby improving the transmission quality and/or reliability.

In step S220, the processor 104 obtains a signal scan result of the each of the network nodes.

In one embodiment, the each of the network nodes may send a broadcast signal, and the broadcast signal may include own identity information of the network node. For example, the control node 100 may send a broadcast signal including the identity information of the control node 100, and the each of the member nodes in FIG. 3 may detect a signal quality indicator of the broadcast signal from the control node 100 accordingly, and establish a corresponding signal scan result. For another example, the member node 11 may send a broadcast signal including the identity information of the member node 11, and the control node 100 and other member nodes in FIG. 3 may detect the signal quality indicator of the broadcast signal from the member node 11 accordingly, and establish a corresponding signal scan result.

Based on this, in the embodiment of the disclosure, the signal scan result of the each of the network nodes may indicate the signal quality indicator of other network nodes. For example, the signal scan result established by the control node 100 may include one or more individual signal quality indicators from the member nodes 11, 12, 13, 21, 22, 23, 31, 32, 33, and 34. As another example, the signal scan result established by the member node 11 may include one or more individual signal quality indicators of the control node 100 and the member node 12, 13, 21, 22, 23, 31, 32, 33, and 34. In one embodiment, the content of the signal scan results established by other member nodes may be inferred based on the above teachings, and therefore will not be repeated in the following.

In one embodiment, the signal scan result established by the each of the network nodes may be implemented in the form of a list, which may, for example, record other network nodes and their corresponding signal quality indicators. In different embodiments, the signal quality indicator may include, for example, signal strength, signal strength indicator, signal range indicator, etc. In addition, the signal quality indicator of the each of the network nodes may also include, for example, GPS location information corresponding to the each of the network nodes, satellite signal strength, etc., but may not be limited thereto.

In one embodiment, the control node 100 obtains the signal scan result of the each of the member nodes directly or indirectly through the tree network topology 310. For example, since the member nodes 11, 13, 21, 22, and 31 in FIG. 3 are directly connected to the control node 100, the control node 100 may directly obtain the corresponding signal scan results from the member nodes 11, 13, 21, 22, and 31.

In addition, since the member nodes 12, 23, 32, 33, and 34 in FIG. 3 are indirectly connected to the control node 100 through other member nodes, the control node 100 may indirectly obtain the signal scan result of the each of the member nodes 12, 23, 32, 33, and 34. For example, the control node 100 may obtain the signal scan result of the member node 12 from the member node 12 through the member node 11. For another example, the control node 100 may obtain the signal scan result of the member node 23 from the member node 23 through the member node 22, but not limited thereto.

Afterwards, in step S230, the processor 104 updates the tree network topology 310 based on the signal scan result of the each of the network nodes.

In the embodiment of the disclosure, step S230 may include one or more of the following first, second, and third embodiments, which will be further described below.

Figure 4:
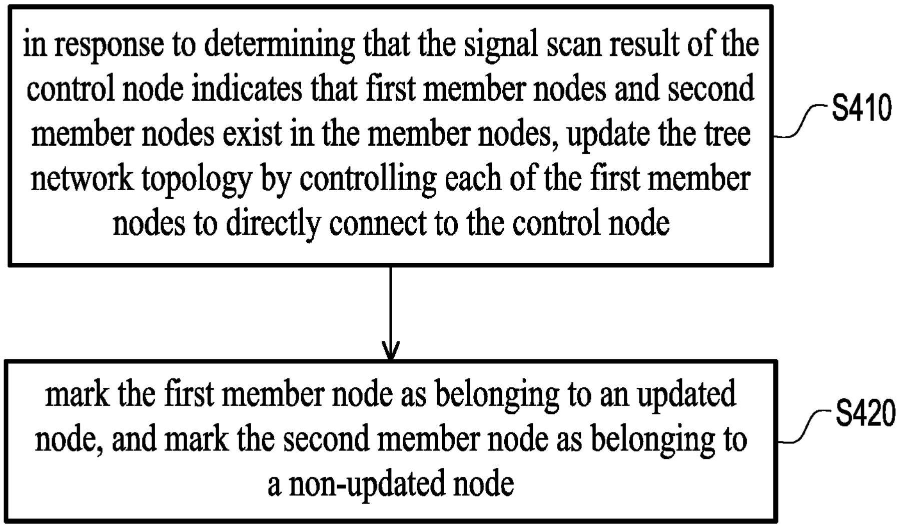
FIG. 4 is a flow chart of updating a tree network topology according to a first embodiment.
Figure 5A:
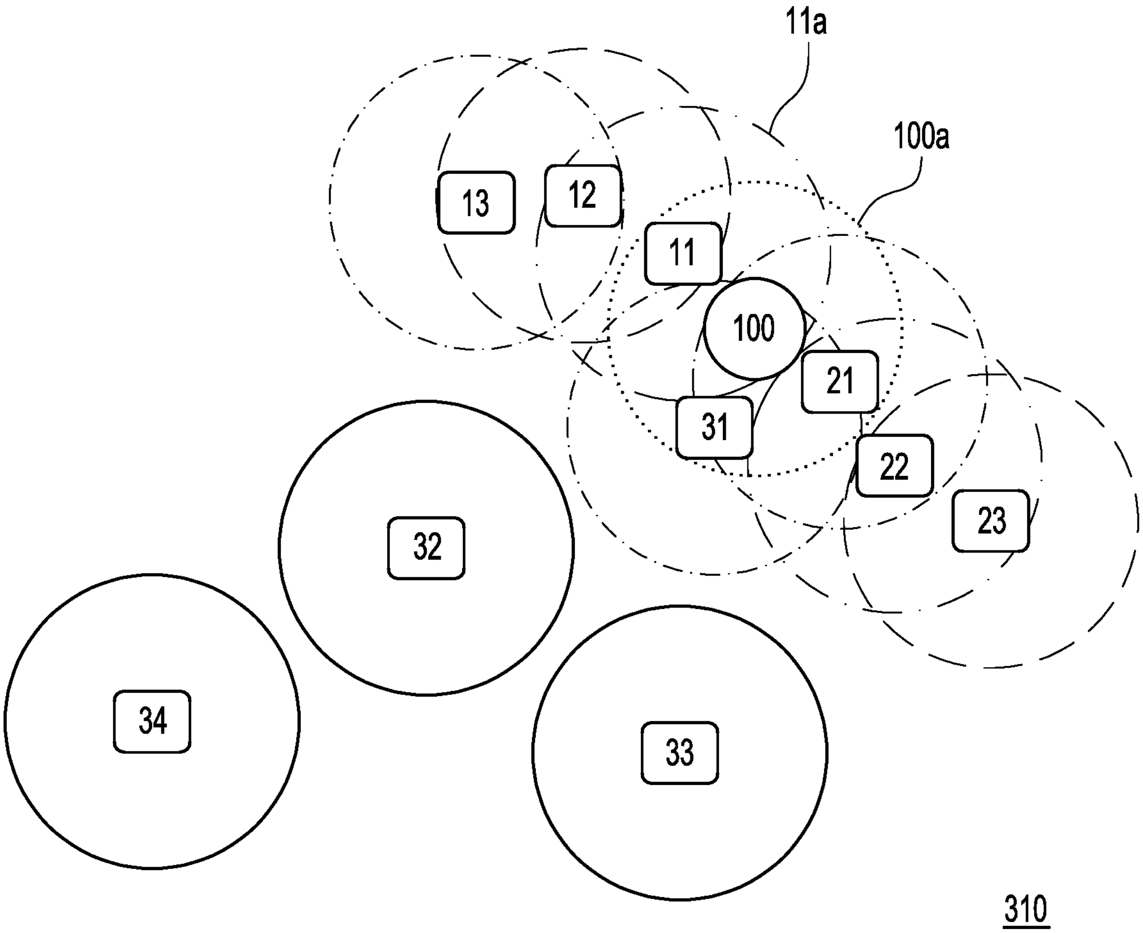
FIG. 5A to FIG. 5B are application scenario diagrams according to the first embodiment of the disclosure.
Figure 5B:
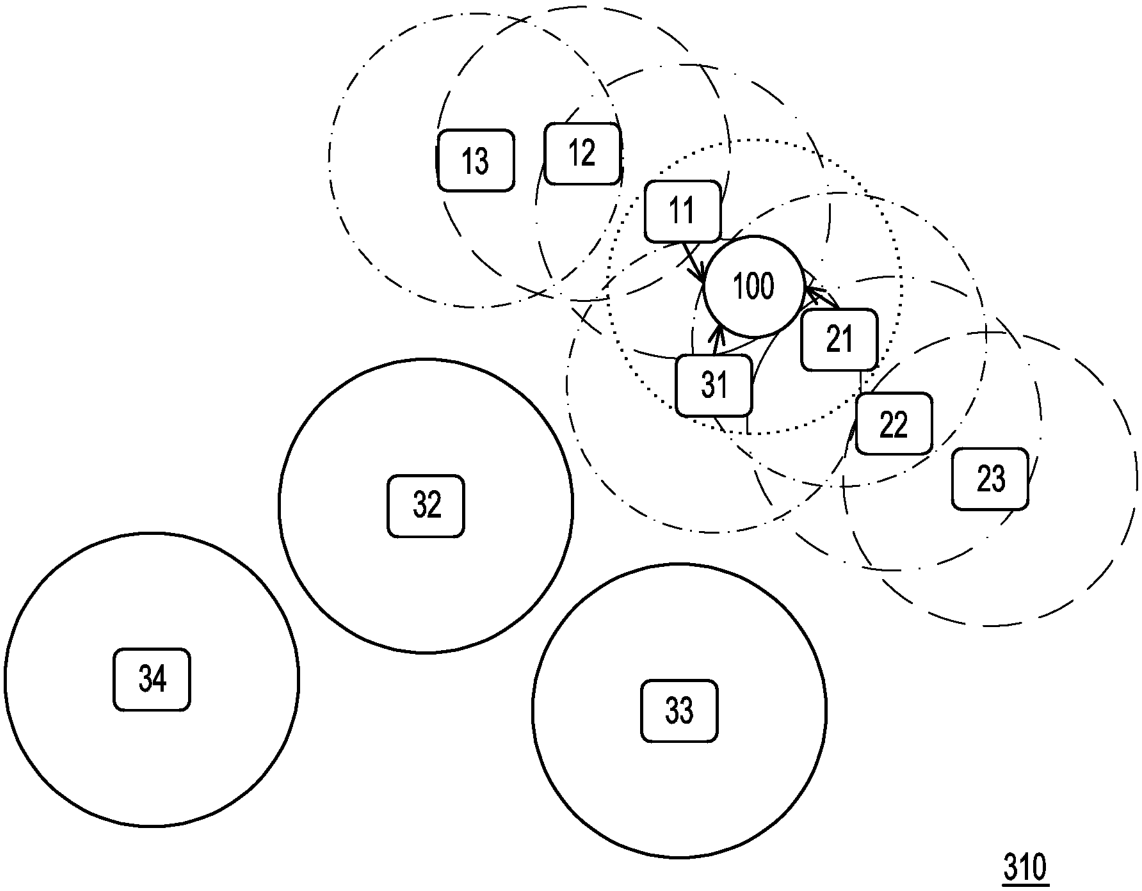

FIG. 4 is a flow chart of updating a tree network topology according to a first embodiment. In addition, in order to make the first embodiment easy to understand, the following will be supplemented by FIG. 5A to FIG. 5B for explanation, where FIG. 5A to FIG. 5B are application scenario diagrams according to the first embodiment of the disclosure.

In step S410, in response to determining that the signal scan result of the control node 100 indicates that first member nodes and second member nodes exist in the member nodes, the processor 104 updates the tree network topology 310 by controlling each of the first member nodes to directly connect to the control node 100.

In one embodiment, a signal quality indicator of the each of the first member nodes in the signal scan result of the control node 100 satisfies a first preset condition, and a signal quality indicator of each of the second member nodes in the signal scan result of the control node 100 does not satisfy the first preset condition.

In one embodiment, if the signal strength of a certain member node in the signal scan result of the control node 100 is no less than a preset strength threshold (e.g., −70 dBm), the processor 104 may determine that the signal quality indicator of the member node in the signal scan result of the control node 100 satisfies the first preset condition. Otherwise, it can be determined that the signal quality indicator of the member node in the signal scan result of the control node 100 does not satisfy the first preset condition, but it may not be limited thereto.

In FIG. 5A, a signal transmission range of the each of the network nodes corresponding to the preset strength threshold may be plotted as a corresponding solid/dashed circle. For example, for the each of the member nodes 11, 21, and 31 located in a signal transmission range 100*a* of the control node 100 (which is, for example, a circular range centered on the control node 100), the signal strength of the broadcast signal from the control node 100 detected by the each of the member nodes 11, 21, and 31 is not lower than the preset strength threshold. For another example, for the member node 12 and the control node 100 located in a signal transmission range 11*a* of the member node 11 (which is, for example, a circular range centered on the member node 11), the signal strength of the broadcast signal from the member node 11 detected by the member node 12 and the control node 100 is not lower than the preset strength threshold.

In addition, for an another node B which is located outside the signal transmission range of a node A, it does not mean that the another node B is not able to receive signals from the node A, but may only mean that the signal strength of the signal received by the node B from the node A is lower than the preset strength threshold. For example, although the member node 33 in FIG. 5A is not located within the signal transmission range 100*a* of the control node 100, it does not necessarily mean that the member node 33 is not able to receive signals from the control node 100, but may only mean that the signal strength of the signal received by the member node 33 from the control node 100 is lower than the preset strength threshold, but may not be limited thereto.

In the scenario of FIG. 5A, since the control node 100 is located within the signal transmission range corresponding to the member nodes 11, 21, and 31, the signal strengths of the member nodes 11, 21, and 31 in the signal scan result of the control node 100 should not be lower than the preset strength threshold. In this case, the processor 104 may determine that the signal quality indicators of the member nodes 11, 21, and 31 in the signal scan result of the control node 100 satisfy the first preset condition, and then determine that the member nodes 11, 21, and 31 are the first member nodes.

Accordingly, the processor 104 may directly connect to the control node 100 by controlling the each of the member nodes 11, 21, and 31 to update the tree network topology 310, as shown in FIG. 5B.

In addition, since the control node 100 is not located within the signal transmission range corresponding to the member nodes 12, 13, 22, 23, 32, 33, and 34, the signal strengths of the member nodes 12, 13, 22, 23, 32, 33, and 34 in the signal scan result of the control node 100 should be lower than the preset strength threshold. In this case, the processor 104 may determine that the signal quality indicators of the member nodes 12, 13, 22, 23, 32, 33, and 34 in the signal scan result of the control node 100 do not satisfy the first preset condition, and then change the member node 12, 13, 22, 23, 32, 33, and 34 are determined to be the above-mentioned second member nodes.

Afterwards, in step S420, the processor 104 may mark the first member node as belonging to an updated node (i.e., a member node whose connection method has been optimized), and mark the second member node as belonging to a non-updated node (i.e., a member node whose connection method has not been optimized). In the scenario of FIG. 5B, the processor 104 may mark the member nodes 11, 21, and 31 as belonging to updated nodes, and mark the member nodes 12, 13, 22, 23, 32, 33, and 34 as belonging to non-updated nodes.

In the embodiment of the disclosure, an updated node can be understood as a member node that has been connected to the control node 100 in a better way (such as higher transmission quality and/or reliability), while a non-updated node can be understood as a member node that may not have been connected to the control node 100 in a better way (such as higher transmission quality and/or reliability), but not limited thereto.

Through the content of the first embodiment, the processor 104 may determine which member nodes are more suitable to be directly connected to the control node 100, and control the member nodes to be directly connected to the control node 100 accordingly. Afterwards, the processor 104 may then execute the means of the second and third embodiments.

Figure 6:
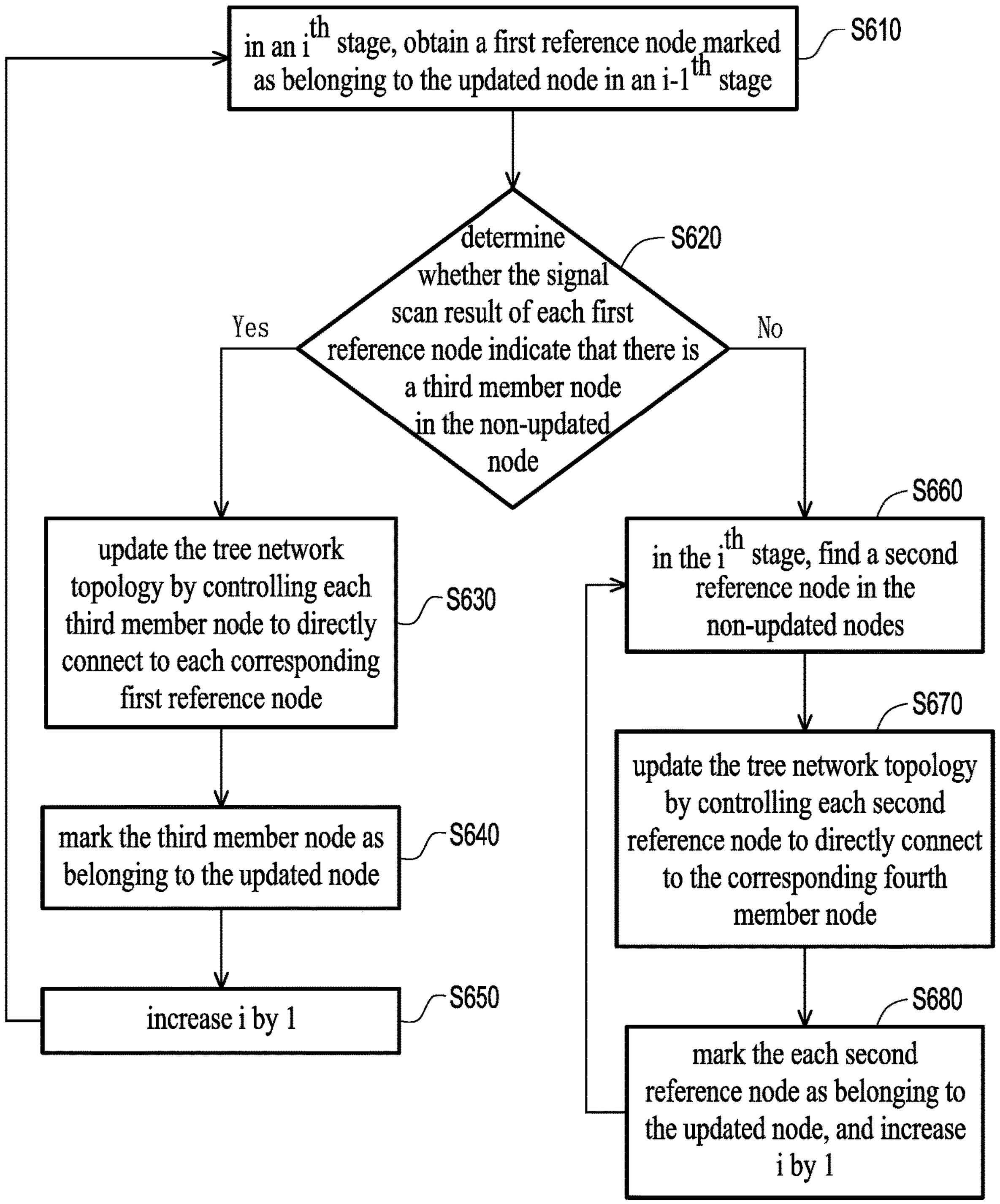
FIG. 6 is a flow chart of updating a tree network topology according to a second embodiment and a third embodiment.

FIG. 6 is a flow chart of updating a tree network topology according to a second embodiment and a third embodiment. In FIG. 6, the processor 104 may implement the content of the second embodiment by executing steps S610 to S650, and implement the content of the third embodiment by executing steps S660 to S680.

In step S610, in an $i^{th}$ stage, the processor 104 obtains a first reference node marked as belonging to the updated node in an $i-1^{th}$ stage, where i is an index value greater than or equal to 1. In step S620, the processor 104 determines whether the signal scan result of each first reference node indicate that there is a third member node in the non-updated node. The signal quality indicator in the signal scan result of each third member node corresponding to the each first reference node satisfies the first preset condition.

In step S630, the processor 104 updates the tree network topology by controlling the each third member node to directly connect to the each corresponding first reference node.

In step S640, the processor 104 marks the third member node as belonging to the updated node, increases i by 1 in step S650, and then returns to step S620.

Figure 7A:
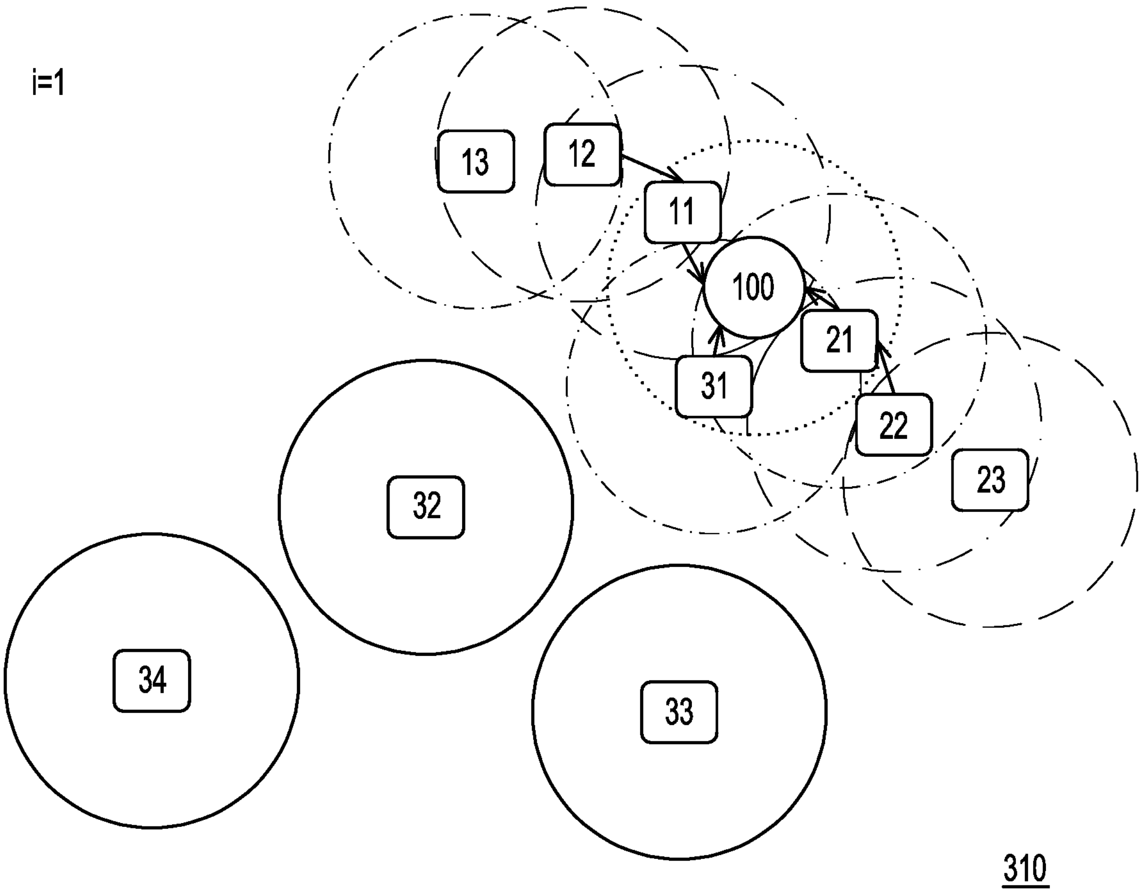
FIG. 7A to FIG. 7C are application scenario diagrams according to the second embodiment of the disclosure.
Figure 7B:
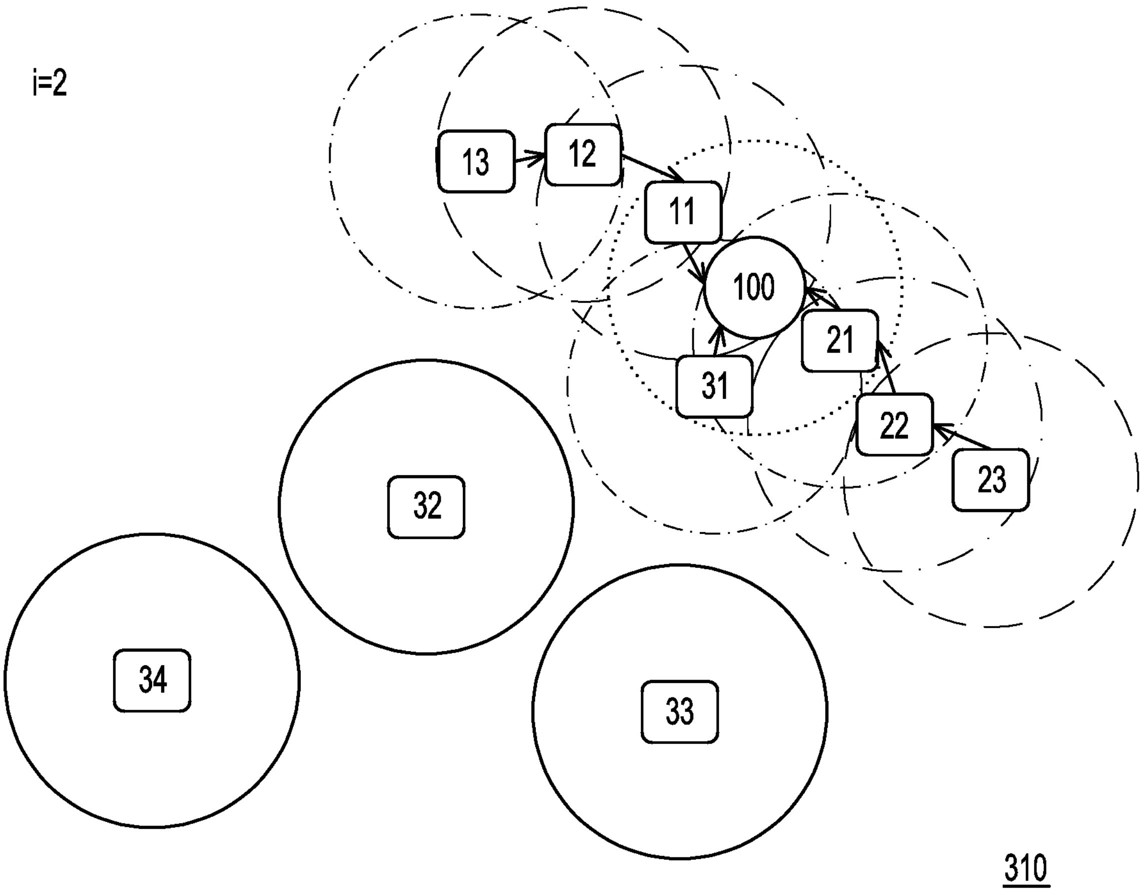
Figure 7C:
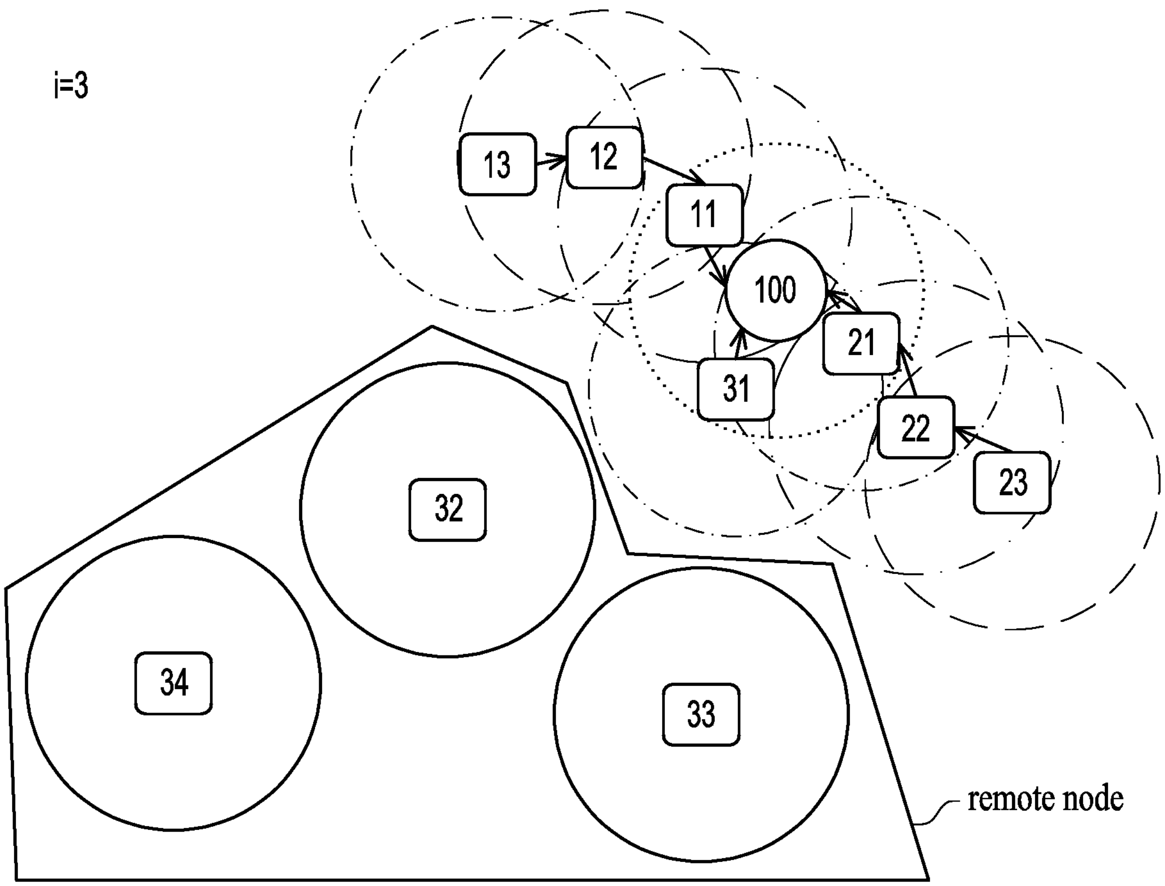

For ease of understanding, the details of the second embodiment will be described below with the aid of FIG. 7A to FIG. 7C. FIG. 7A to FIG. 7C are application scenario diagrams according to the second embodiment of the disclosure.

In the scenario of FIG. 7A, it is assumed that the processor 104 has just completed the means of the first embodiment and determined the tree network topology 310 as shown in FIG. 5B. In this case, the processor 104 may continue to execute the means of the second embodiment.

When starting the second embodiment, an initial value of i may be set to 1. In this case, the processor 104 may determine the first member node in the first embodiment as the first reference node in step S610. That is, when i is 1, the processor 104 may determine the member nodes 11, 21, and 31 in FIG. 7A as the first reference node in step S610.

Afterwards, the processor 104 may determine in step S620 whether the signal scan results of the each of the member nodes 11, 21, and 31 indicate that there is a third member node in the non-updated nodes (e.g., member node 12, 13, 22, 23, 32, 33, and 34).

In FIG. 7A, since the member node 12 is located within the signal transmission range corresponding to the member node 11, the signal strength of the member node 12 in the signal scan result of the member node 11 should not be lower than the preset strength threshold. In this case, the processor 104 may determine that the signal quality indicator of the member node 12 in the signal scan result of the member node 11 satisfies the first preset condition, and then determines the member node 12 as the third member node corresponding to the member node 11.

In addition, since the member node 22 is located within the signal transmission range corresponding to the member node 21, the signal strength of the member node 22 in the signal scan result of the member node 21 should not be lower than the preset strength threshold. In this case, the processor 104 may determine that the signal quality indicator of the member node 22 in the signal scan result of the member node 21 satisfies the first preset condition, and then determines the member node 22 as the third member node corresponding to the member node 21.

Based on this, when i is 1, a determination result of the processor 104 in step S620 should be "yes", and step S630 may be continued to control the each third member node to directly connect to the each corresponding first reference node to update the tree network topology 310.

In the scenario of FIG. 7A, the processor 104 may control the member node 12 to be directly connected to the corresponding first reference node (i.e., the member node 11), and control the member node 22 to be directly connected to the corresponding first reference node (i.e., the member node 21), to update the tree network topology 310.

Afterwards, the processor 104 may mark the member nodes 12 and 22 as belonging to the updated nodes in step S640. In this case, the non-updated nodes are adjusted to include 13, 23, 32, 33, and 34 accordingly. Then, the processor 104 may increase i by 1 (i.e., i=2) in step S650, and return to step S620.

Referring to FIG. 7B, when i is equal to 2, the processor 104 may obtain the first reference node marked as belonging to the updated node in a first (i.e., i−1) stage. Since the member nodes 12 and 22 are marked as updated nodes in the first stage, the processor 104 may accordingly determine the member nodes 12 and 22 as the first reference nodes considered in a second stage.

Afterwards, the processor 104 may determine in step S620 whether the signal scan results of the each of the member nodes 12 and 22 indicate that there is a third member node in the non-updated node (e.g., the member node 13, 23, 32, 33, and 34).

In FIG. 7B, since the member node 13 is located within the signal transmission range corresponding to the member node 12, the signal strength of the member node 13 in the signal scan result of the member node 12 should not be lower than the preset strength threshold. In this case, the processor 104 may determine that the signal quality indicator of the member node 13 in the signal scan result of the member node 12 satisfies the first preset condition, and then determines the member node 13 as the third member node corresponding to the member node 12.

In addition, since the member node 23 is located within the signal transmission range corresponding to the member node 22, the signal strength of the member node 23 in the signal scan result of the member node 22 should not be lower than the preset strength threshold. In this case, the processor 104 may determine that the signal quality indicator of the member node 23 in the signal scan result of the member node 22 satisfies the first preset condition, and then determine the member node 23 as the third member node corresponding to the member node 22.

Based on this, when i is 2, the determination result of the processor 104 in step S620 should be "yes", and step S630 may be continued to control the each third member node to directly connect to the each corresponding first reference node to update the tree network topology 310.

In the scenario of FIG. 7B, the processor 104 may control the member node 13 to be directly connected to the corresponding first reference node (i.e., the member node 12), and control the member node 23 to be directly connected to the corresponding first reference node (i.e., the member node 22) to update the tree network topology 310.

Afterwards, the processor 104 may mark the member nodes 13 and 23 as belonging to the updated nodes in step S640. In this case, the non-updated nodes are adjusted to include 32, 33, and 34 accordingly. Then, the processor 104 may increase i by 1 (i.e., i=3) in step S650, and return to step S620.

In the case where i is equal to 3, the processor 104 may obtain the first reference node marked as belonging to the updated node in the second (i.e., i−1) stage. Since the member nodes 13 and 23 are marked as updated nodes in the second stage, the processor 104 may accordingly determine the member nodes 13 and 23 as the first reference nodes considered in a third stage.

Afterwards, the processor 104 may determine in step S620 whether the signal scan results of the each of the member nodes 13 and 23 indicate that there is a third member node in the non-updated nodes (e.g., the member nodes 32, 33, and 34).

It can be seen from FIG. 7B that the signal strengths of the member nodes 13 and 23 do not reach the preset strength threshold for the member nodes 32, 33, and 34, and therefore the determination result of the processor 104 in step S620 should be "no". In this case, the member nodes 32, 33, and 34 may be called remote nodes as shown in FIG. 7C, and the processor 104 may process the remote nodes by executing the means of the third embodiment (i.e., steps S660 to S680), so that the remote nodes may be integrated into the tree network topology 310 in a more suitable way.

From another point of view, the processor 104 may also be understood to, when determining that the non-updated nodes only include remote nodes that are not within the signal transmission range of any updated node, handle the remote nodes accordingly by executing the means of the third embodiment (i.e., steps S660 to S680), but may not be limited thereto.

In step S660, in the $i^{th}$ stage, the processor 104 finds a second reference node in the non-updated nodes. The signal scan result of each second reference node includes a fourth member node belonging to the updated node.

In step S670, the processor 104 updates the tree network topology by controlling the each second reference node to directly connect to the corresponding fourth member node.

In step S680, the processor 104 marks the each second reference node as belonging to the updated node, increases i by 1, and returns to step S660.

In the third embodiment, the processor 104 may recursively execute steps S660 to S680 until each member node is marked as an updated node.

Figure 8A:
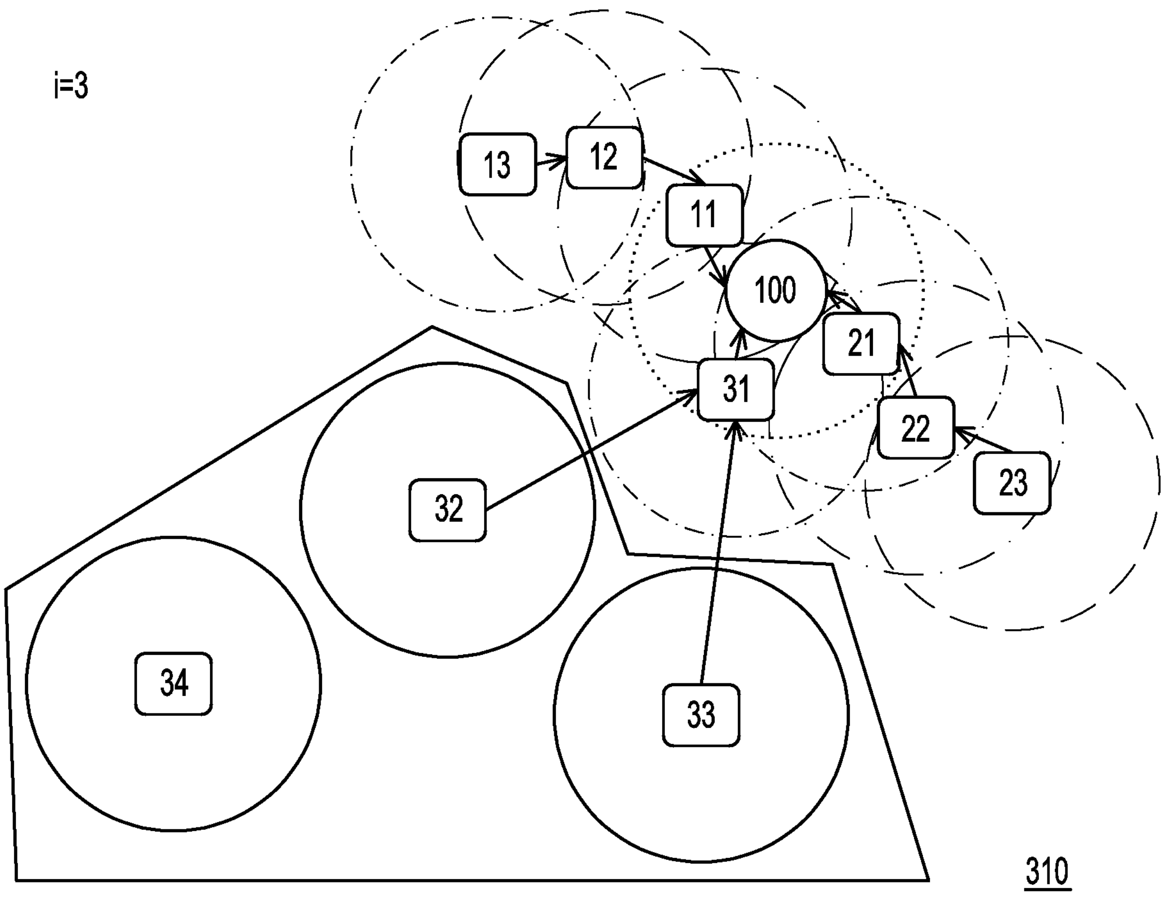
FIG. 8A to FIG. 8C are application scenario diagrams according to the third embodiment of the disclosure.
Figure 8B:
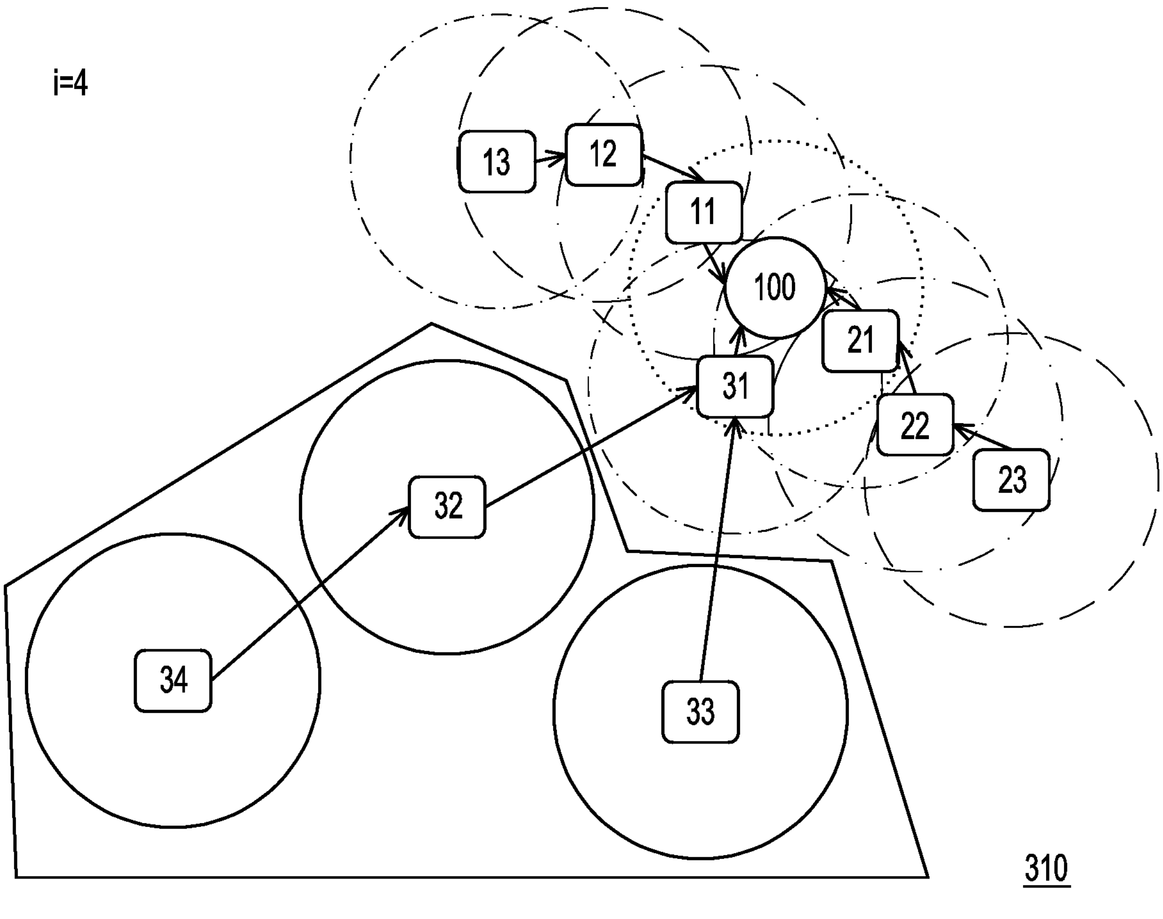
Figure 8C:
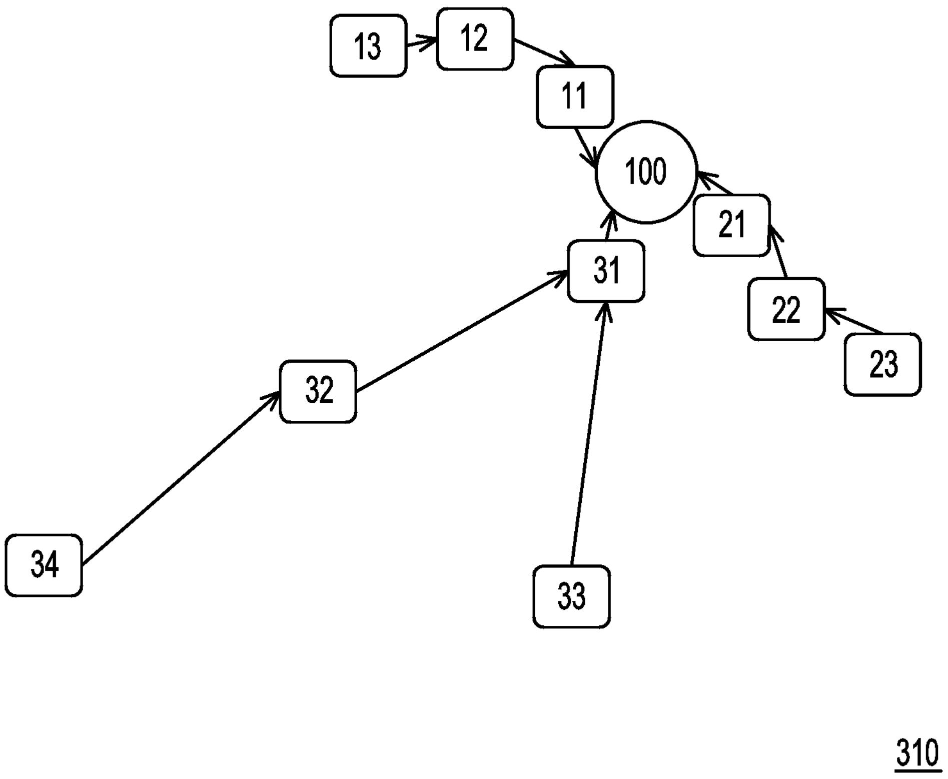

In order to make the third embodiment easy to understand, the following will be supplemented by FIG. 8A to FIG. 8C for explanation, where FIG. 8A to FIG. 8C are application scenario diagrams according to the third embodiment of the disclosure.

In FIG. 8A, the scenario shown may be, for example, the same as the scenario in FIG. 7C, that is, the scenario where i equals 3. In this case, when executing step S660, the processor 104 may find the second reference node in the member nodes 32, 33, and 34 (i.e., the non-updated nodes).

In the scenario of FIG. 8A, it is assumed that the signal scan result of the member node 32 includes (only) the member node 31 belonging to the updated node, the processor 104 may determine the member node 31 as the fourth member node corresponding to member node 32. In another embodiment, it is assumed that the signal scan result of the member node 32 also includes other updated nodes, the processor 104 may select one of the updated nodes with the best signal quality indicator (e.g., the highest signal strength that is higher than a lower signal strength limit (e.g., −70 dBm or SNR 35 dB)) as the fourth member node corresponding to the member node 32, and may not be limited thereto.

In addition, it is assumed that the signal scan result of the member node 33 also includes (only) the member node 31 belonging to the updated node, the processor 104 may also determine the member node 31 as the fourth member node corresponding to the member node 33. In another embodiment, it is assumed that the signal scan result of the member node 33 also includes other updated nodes, and the processor 104 may select one of the updated nodes with the highest signal strength that is higher than the lower signal strength limit as the fourth member node corresponding to the member node 33, and may not be limited thereto.

In FIG. 8A, since the member nodes 32 and 33 both have the corresponding fourth member node (i.e., the member node 31), the processor 104 may determine the member nodes 32 and 33 as the second reference node considered in step S660.

Afterwards, the processor 104 may execute step S670 to control the member node 32 to be directly connected to the corresponding fourth member node (i.e., the member node 31), and to control the member node 33 to be directly connected to the corresponding fourth member node (i.e., the member node 31) to update the tree network topology 310 to the state shown in FIG. 8A.

Next, the processor 104 may execute step S680 to mark the member nodes 32 and 33 as belonging to the updated nodes, increase i by 1 (i.e., i=4), and return to step S660.

Please refer to FIG. 8B, which corresponds to the situation where i is equal to 4, for example. In this case, when executing step S660, the processor 104 may find the second reference node in the member node 34 (i.e., the non-updated nodes).

In the scenario of FIG. 8B, it is assumed that the signal scan result of the member node 34 includes (only) the member node 32 belonging to the updated node, the processor 104 may determine the member node 32 as the fourth member node corresponding to the member node 34. In another embodiment, it is assumed that the signal scan result of the member node 34 also includes other updated nodes, and the processor 104 may select one of the updated nodes with the highest signal strength that is higher than the lower signal strength limit as the fourth member node corresponding to the member node 34, and may not be limited thereto.

In FIG. 8B, since the member node 34 has a corresponding fourth member node (i.e., the member node 32), the processor 104 may determine the member node 34 as the second reference node considered in step S660.

Afterwards, the processor 104 may execute step S670 to control the member node 34 to directly connect to the corresponding fourth member node (i.e., the member node 32) to update the tree network topology 310 to the state shown in FIG. 8B.

Next, the processor 104 may execute step S680 to mark the member node 34 as belonging to the updated node. At this time, since the each of the member nodes has been marked as an updated node, the processor 104 may determine that the content of the third embodiment has been completed, and may no longer recursively execute steps S660 to S680, but may not limited thereto.

In this case, the fully updated tree network topology 310 may have the state as shown in FIG. 8C. It can be seen from FIG. 3 and FIG. 8C that in the updated tree network topology 310, the member node 13 is adjusted from being directly connected to the control node 100 to being indirectly connected to the control node 100 through the member nodes 12 and 11 in sequence. Similarly, the member node 22 is adjusted from being directly connected to the control node 100 to being indirectly connected to the control node 100 through the member node 21.

Thus, the member nodes 13 and 22 in FIG. 8C may obtain better transmission quality and/or reliability. In addition, since the member nodes 32, 33, and 34 (i.e., the remote nodes) are far away from the control node 100 and other member nodes that are non-remote nodes, in the initial tree network topology determined in step S210, the member nodes 32, 33, and 34 may be connected to the control node 100 in a less suitable way.

However, since the embodiment of the disclosure may determine a better connection method for the remote nodes through the third embodiment, the transmission quality and/or reliability of each remote node may also be better ensured.

In order to make the above concepts clearer, the following will be supplemented by FIG. 9A to FIG. 9E for explanation, where FIG. 9A to FIG. 9E are schematic diagrams of inappropriate connection methods of remote nodes according to the embodiment of the disclosure.

Figure 9A:
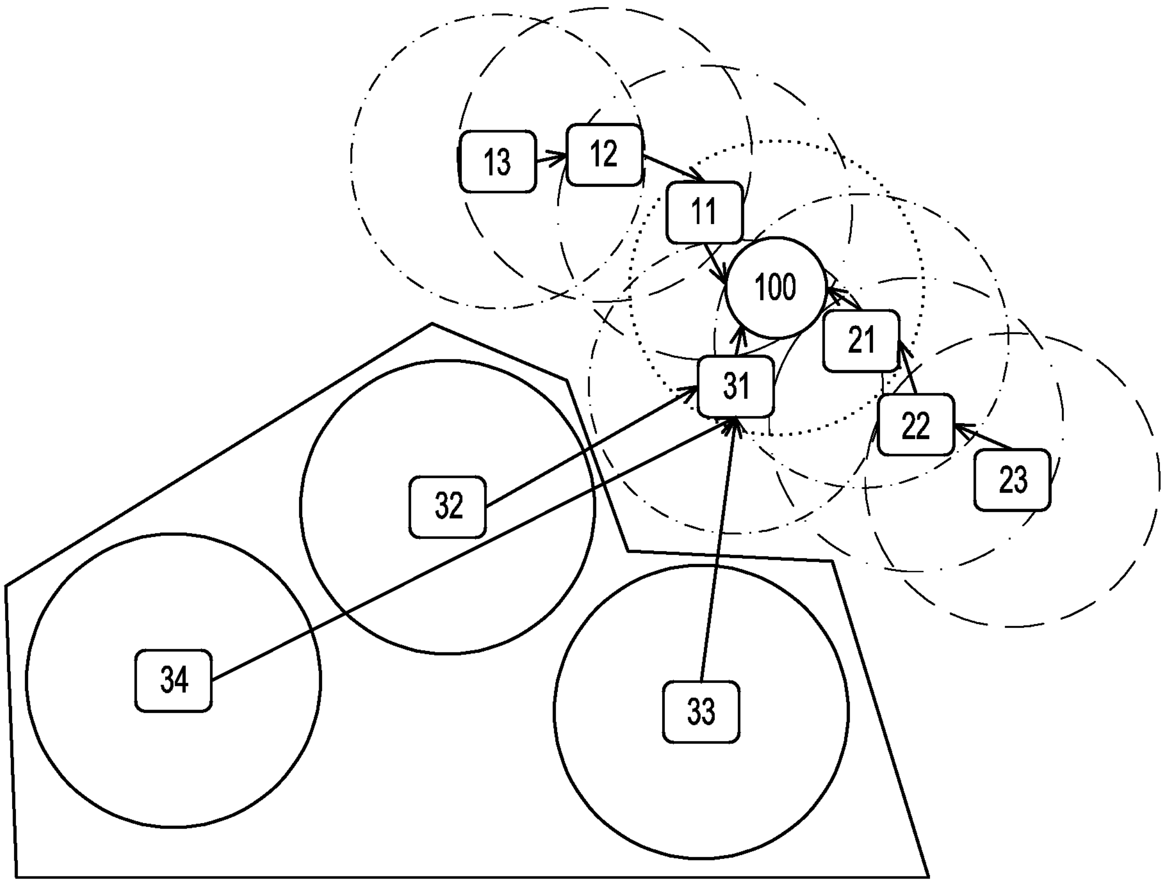
FIG. 9A to FIG. 9E are schematic diagrams of inappropriate connection methods of remote nodes according to the embodiment of the disclosure.

In FIG. 9A, it is assumed that the member node 34 is arranged to be connected to the control node 100 through the member node 31 in step S210. In this case, the member node 34 may not be able to achieve better transmission quality and/or reliability due to the long distance between the member node 34 and the member node 31.

Figure 9B:
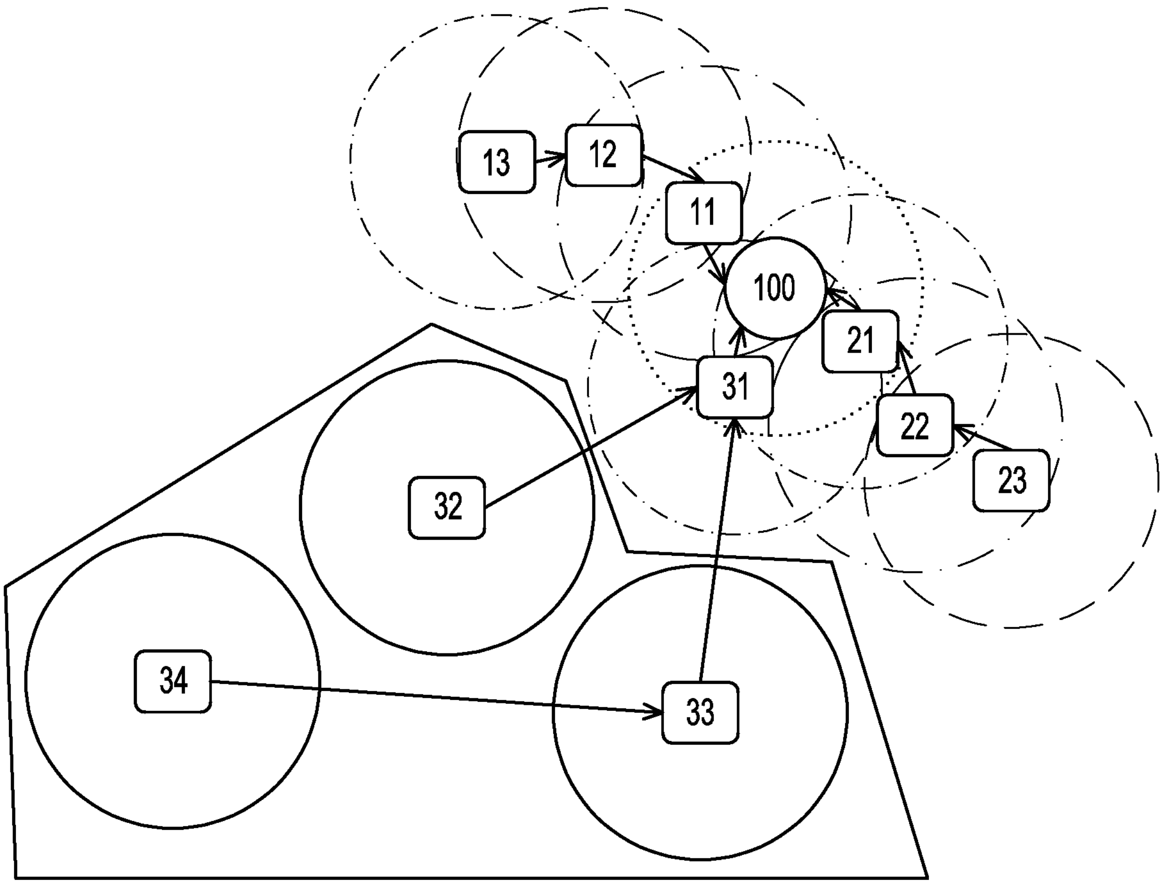

In FIG. 9B, it is assumed that member node 34 is arranged to be connected to the control node 100 through the member node 33 in step S210. In this case, the member node 34 may not be able to achieve better transmission quality and/or reliability due to the long distance between the member node 34 and the member node 33.

Figure 9C:
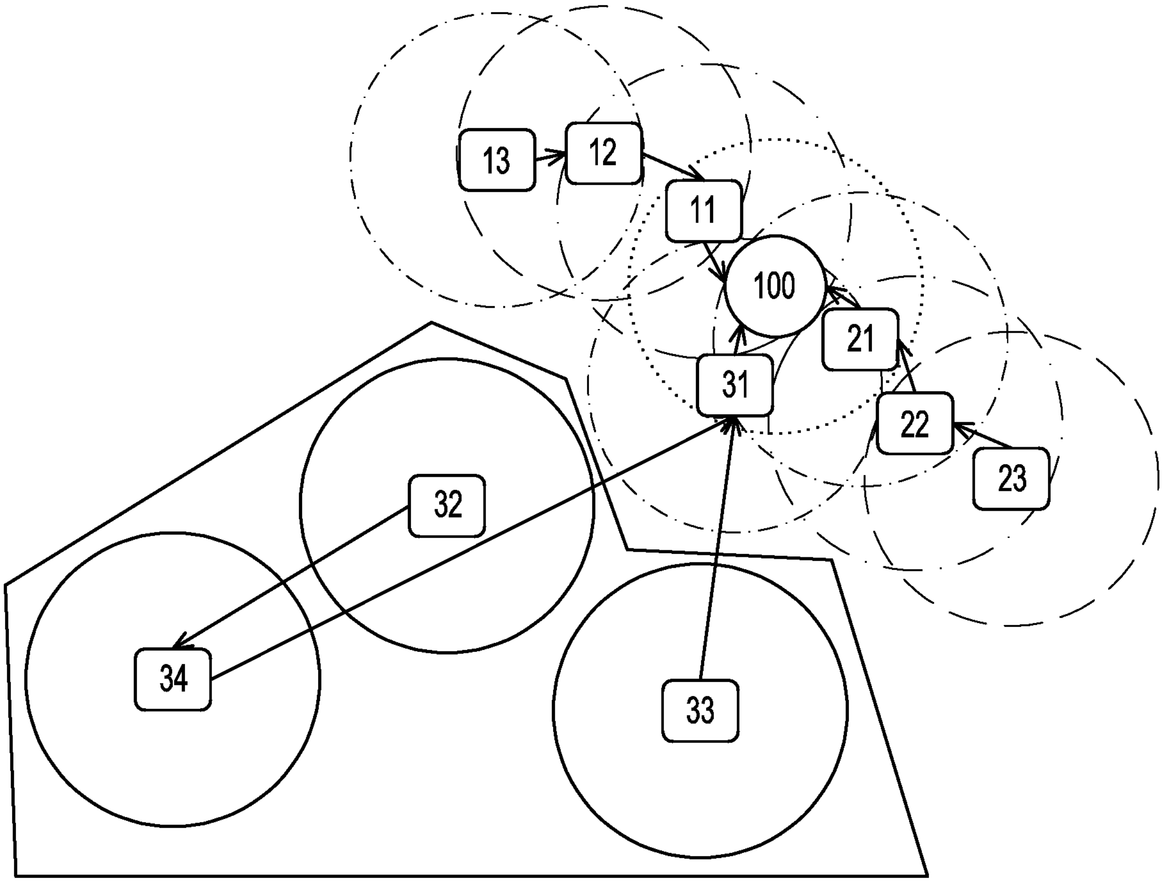

In FIG. 9C, it is assumed that the member node 32 is arranged to be connected to the control node 100 through the member nodes 34 and 31 in sequence in step S210. In this case, the member node 34 may not be able to achieve better transmission quality and/or reliability due to the long distance between the member node 34 and the member node 31. In addition, the member node 32 may cause a longer transmission delay by connecting to the control node 100 in a less suitable manner.

Figure 9D:
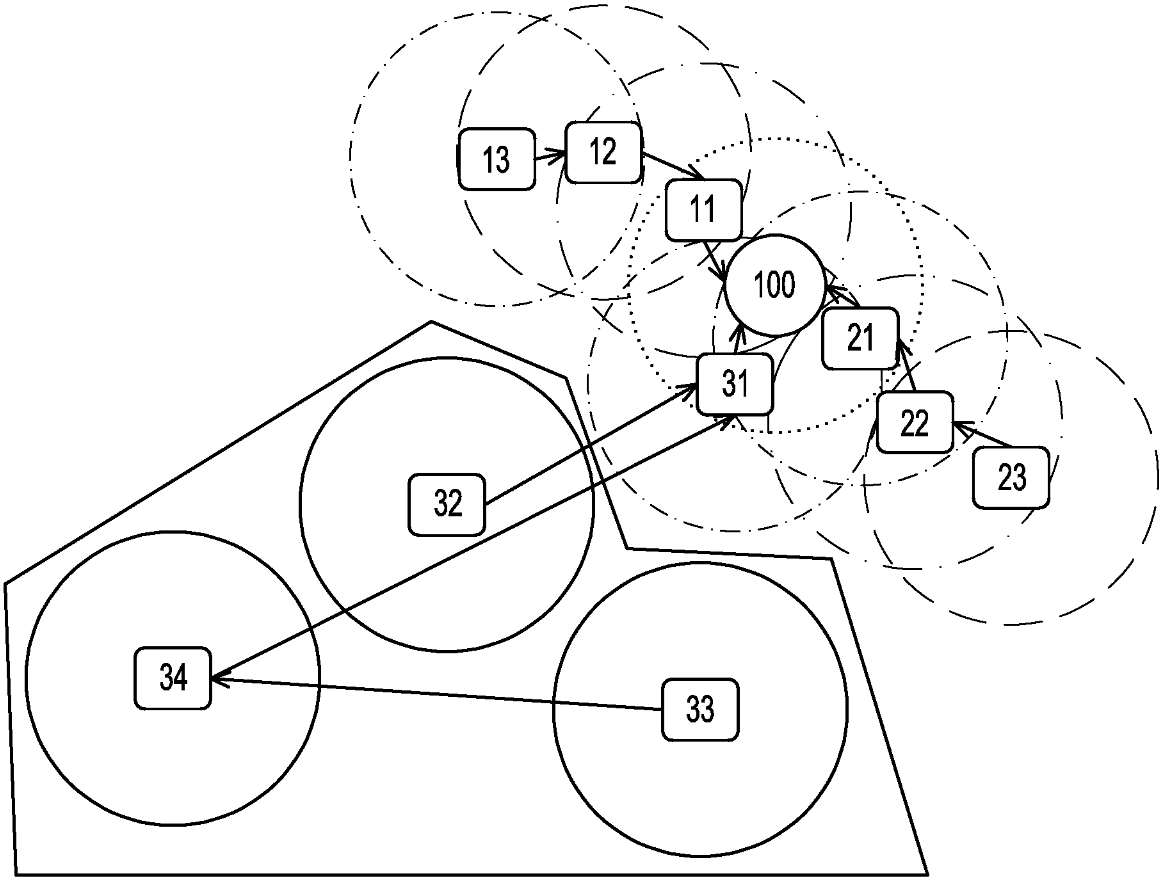

In FIG. 9D, it is assumed that the member node 33 is arranged to be connected to the control node 100 through the member nodes 34 and 31 in sequence in step S210. In this case, the member node 34 may not be able to achieve better transmission quality and/or reliability due to the long distance between the member node 34 and the member node 31. In addition, the member node 33 may cause a longer transmission delay by connecting to the control node 100 in a less suitable manner.

Figure 9E:
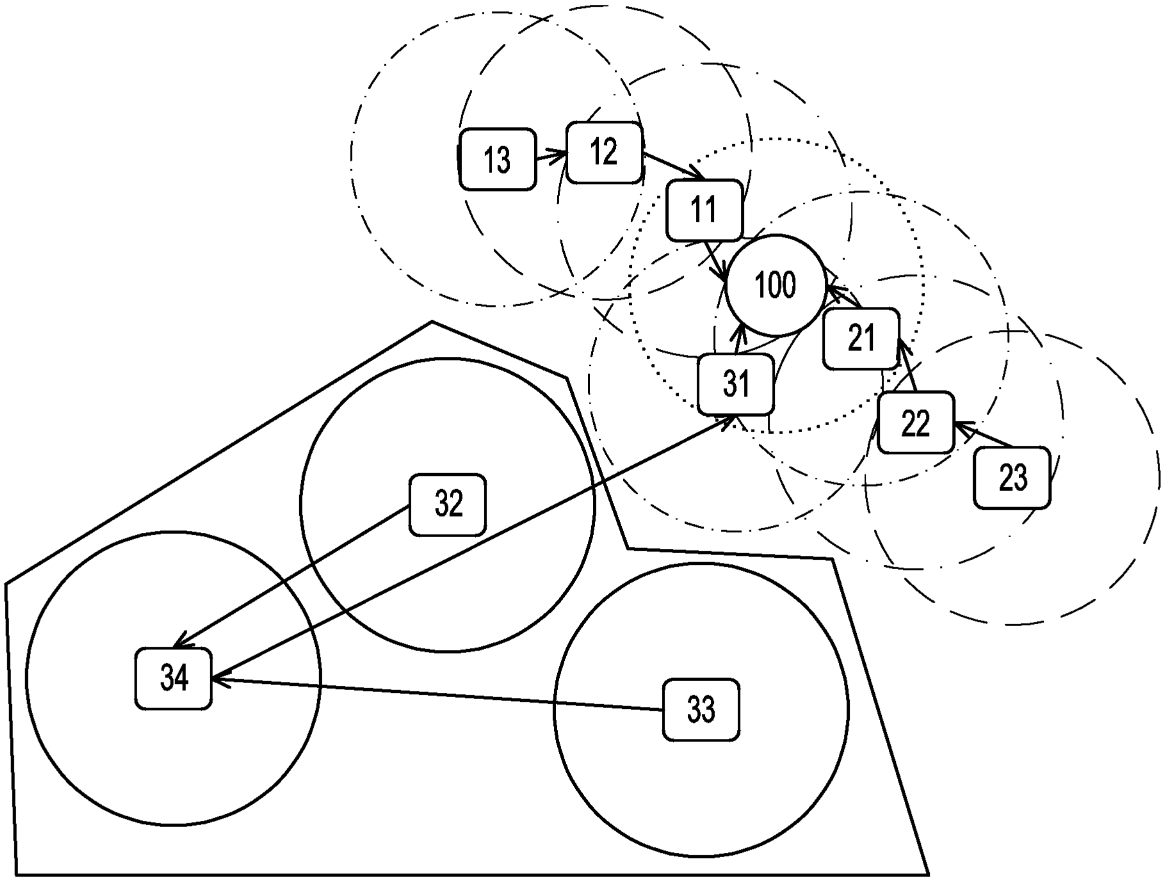

In FIG. 9E, it is assumed that the member nodes 32 and 33 are both arranged to be connected to the control node 100 through the member nodes 34 and 31 in sequence in step S210. In this case, the member node 34 may not be able to achieve better transmission quality and/or reliability due to the long distance between the member node 34 and the member node 31. In addition, the member nodes 32 and 33 may cause a longer transmission delay by connecting to the control node 100 in a less suitable manner.

However, in the embodiment of the disclosure, the each remote node (such as the member node 32, 33, and 34) may be connected to the control node 100 in a better way through the third embodiment, thus allowing the each remote node to achieve better transmission quality and/or reliability.

In some embodiments, the control node 100 may execute the method shown in FIG. 2 to update the tree network topology 310 periodically/irregularly each time the control node 100 obtains a signal scan result from one or more of the network nodes.

In the embodiment of the disclosure, when a member node operating as a relay node (i.e., a parent node) cannot normally serve the corresponding child node due to failure or other reasons, the operation of itself and the child node may be seriously affected.

Thus, the embodiment of the disclosure further proposes a method for maintaining a tree network topology, which may be used to solve the above technical problems.

Figure 10:
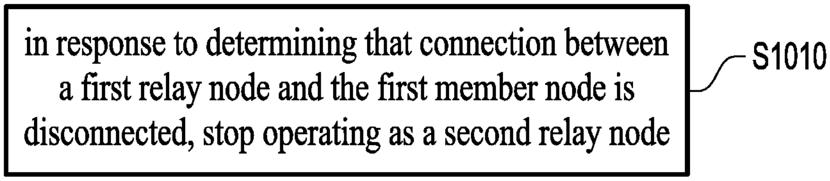
FIG. 10 illustrates a method for maintaining a tree network topology according to a fourth embodiment of the disclosure.

FIG. 10 illustrates a method for maintaining a tree network topology according to a fourth embodiment of the disclosure. The method in this embodiment may be executed by any member node (hereinafter referred to as a first member node) in the multi-hop wireless network system 300.

In the fourth embodiment, the first member node may be connected to the control node 100 of the network nodes through a first relay node and operate as a second relay node. In other words, the first member node may operate as a child node of the first relay node, and may also operate as the second relay node (i.e., the parent node) of another member node (such as the second member node of the network nodes).

It should be understood that the first and second member nodes referred to in the embodiments following FIG. 10 may have different concepts than the first and second member nodes referred to in FIG. 1 to FIG. 9E. For example, the first and second member nodes referred to in the embodiments following FIG. 10 may be simply understood as any two member nodes in the multi-hop wireless network system 300, but are not limited thereto.

In one embodiment, the first member node operating as the second relay node may connect to the wireless terminal interface of the second member node through the access point interface of the first member node to operate as the second relay node of the second member node.

In addition, the first member node may also operate as a wireless terminal served by the first relay node. That is, the first member node may connect to an access point interface of the first relay node through a wireless terminal interface of the first member node, and the first relay node may provide an access point function and operate as an access point of the first member node.

In the fourth embodiment, the first member node may determine whether connection between the first relay node and the first member node is disconnected. In one embodiment, the first member node may determine whether the connection between its wireless terminal interface and the access point interface of the first relay node is disconnected. If so, the first member node may determine that the connection between the first relay node and the first member node has been disconnected. In addition, in one embodiment, if the first member node determines that a beacon miss occurs between the first member node and the first relay node, the first member node may determine that the connection between the first relay node and the first member node has been disconnected, but may not be limited thereto.

In step S1010 of FIG. 10, in response to determining that the connection between the first relay node and the first member node is disconnected, the first member node stops operating as the second relay node. In the fourth embodiment, the first member node may stop operating as the second relay node (of the second member node and/or other member nodes) by disabling the access point interface of the first member node.

From another point of view, the first member node may disable the access point function provided by the first member node as soon as the first member node determines that the connection between the first member node and its corresponding parent node has been disconnected, thus allowing the first member node to temporarily cease to operate as a parent/access point for other member nodes. In this case, the second member node, which considers the first member node as its parent node, also determines that the connection between the second member node and the first member node is disconnected, and then also disable the access point function provided by the second member node. In other words, the second member node will also temporarily cease to operate as the parent node/access point of other member nodes.

Based on this, the child node may be prevented from misunderstanding that the parent node can still provide the access point function normally, and thus allows the child node to attempt to change to a (new) parent node that provides the access point function normally. In this way, the transmission capabilities of the child node may be maintained, thereby better ensuring the transmission performance of the tree network topology.

Figure 11A:
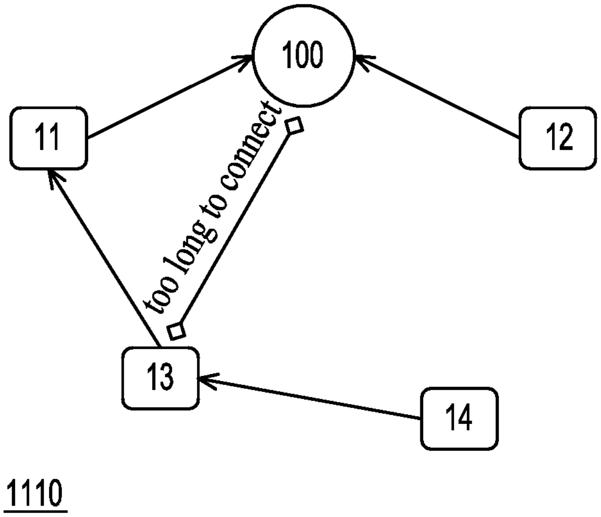
FIG. 11A to FIG. 11D are application scenario diagrams according to the fourth embodiment of the disclosure.
Figure 11B:
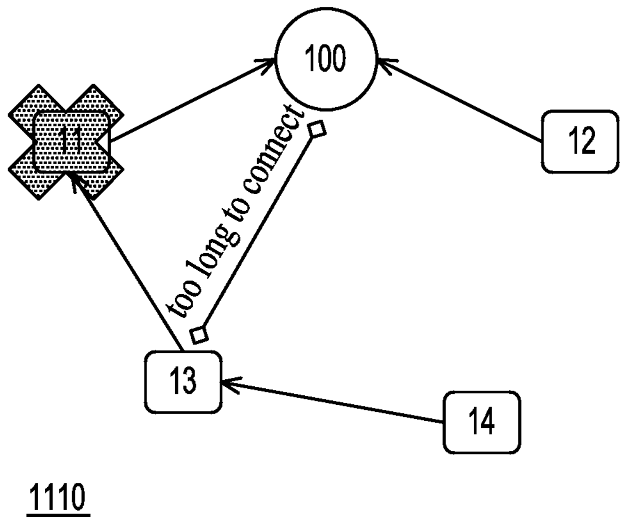
Figure 11C:
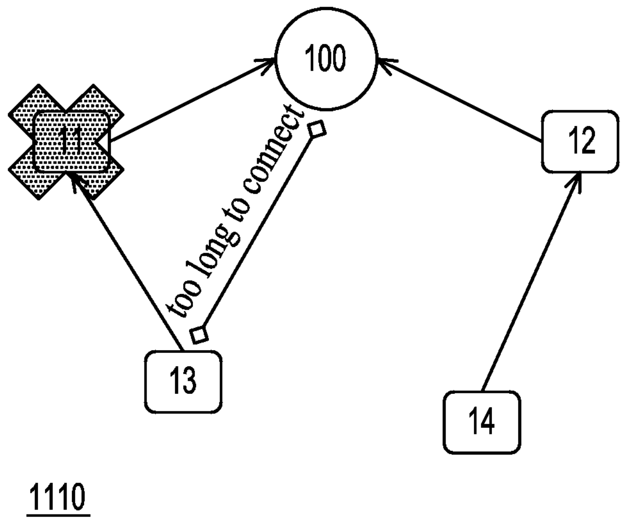

In order to make the above concepts clearer, the following will be supplemented by FIG. 11A to FIG. 11C for explanation, where FIG. 11A to FIG. 11D are application scenario diagrams according to the fourth embodiment of the disclosure.

In FIG. 11A, it is assumed that the control node 100 establishes a tree network topology 1110 through the mechanism of the previous embodiment, the member node 13 operates as the relay node of the member node 14, the member node 11 operates as the relay node of the member node 13, and the member node 12 is directly connected to the control node 100.

In the fourth embodiment, it is assumed that the member node 13 corresponds to the first member node mentioned in FIG. 10, but this is only used as an example and is not used to limit the possible implementation of the disclosure. In this case, the member node 11 may be understood as the first relay node in FIG. 10, and the member node 14 may be understood as the second member node served by the member node 13, but may not be limited thereto.

In FIG. 11A, it is assumed that a distance between the member node 13 and the control node 100 exceeds a connection distance threshold. In this case, the member node 13 may be regarded as physically unable to be directly connected to the control node 100, and therefore must connect to the control node 100 through another relay node. In addition, a distance between the member node 14 and the control node 100 is also assumed to exceed the connection distance threshold, and thus the member node 14 must also be connected to the control node 100 through another relay node.

In FIG. 11B, it is assumed that the member node 11 cannot operate normally for some reason (for example, it cannot provide an access point function), the member node 13 may accordingly determine that the connection between the member node 11 and the member node 13 is disconnected according to the previous teachings. In this case, the member node 13 may accordingly stop operating as the relay node for another member node (e.g., the member node 14) (corresponding to step S1010). For example, the member node 13 may stop providing the access point function by disabling its own access point interface, but is not limited thereto.

Similarly, the member node 14 may also determine accordingly that the connection between the member node 14 and the member node 13 is disconnected according to the previous teachings. In this case, the member node 14 may also stop operating as a relay node for another member node accordingly. For example, the member node 14 may also stop providing the access point function by disabling its own access point interface, but it is not limited thereto.

Then, the member nodes 14 and 13 try to find new relay nodes. In FIG. 11C, the control node 100 may control the member node 14 to connect to the member node 12 according to the teachings of previous embodiments (such as the second and/or third embodiment) after obtaining the signal scan result provided by the member node 14. In this case, the member node 14 may consider the member node 12 as the relay node (i.e., the parent node) and may operate again as a relay node for another member node by enabling the access point interface of the member node 14.

Figure 11D:
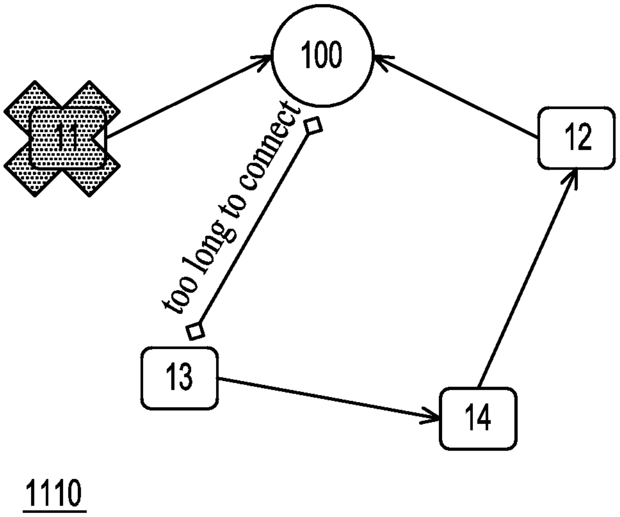

In FIG. 11D, the control node 100 may control the member node 13 to connect to the member node 14 according to the teachings of previous embodiments (such as the second and/or third embodiment) after obtaining the signal scan result provided by the member node 13. In this case, the member node 13 may consider the member node 14 as the relay node (i.e., the parent node) and may operate again as a relay node for another member node by enabling the access point interface of the member node 13.

In one embodiment, if the member node 13 fails to stop operating as a relay node (for example, by disabling the access point interface) as soon as it determines that the connection between the member node 11 and the member node 13 is disconnected, the member node 14 served by the member node 13 will not be able to immediately use another member node as the relay node. In this case, the member node 13 will accordingly not be able to immediately use another member node as the relay node. In other words, the member nodes 13 and 14 continue to be trapped in the scenario shown in FIG. 11B.

When the member nodes 13 and 14 are trapped in the scenario shown in FIG. 11B, not only will the member node 13 not be able to obtain the relevant data of the mesh network through the relay node, but also the member node 14 that the member node 13 serves will not be able to obtain the relevant data of the mesh network. In this case, only when the member node 11 returns to normal operation, the member node 13 may use the member node 11 as the relay node again, and then operate normally with the architecture shown in FIG. 11A.

In addition, if the member node 13 fails to stop operating as a relay node (for example, by disabling the access point interface) as soon as it determines that the connection between the member node 11 and the member node 13 is disconnected, the member node 13 may also switch to using the member node 14 as the relay node. In other words, the member nodes 13 and 14 may become parent and child nodes of each other. In this case, the member nodes 13 and 14 are still not be able to obtain the relevant data of the mesh network, and thus will not be able to operate normally.

However, through the mechanisms shown in FIG. 11A to FIG. 11D, the above situation may be avoided, thereby better maintaining the performance of the tree network topology 1110.

To sum up, the technical solution of the embodiments of the disclosure may update the tree network topology based on the signal scan result of the each of the network nodes after determining the initial tree network topology, so that the each of the member nodes may be connected to the control node in a better way. This enables the each of the member nodes to achieve better transmission quality and/or reliability.

In addition, the embodiment of the disclosure further proposes a technical solution that allows a member node to stop operating as a relay node as soon as the member node determines that the connection between the member node and the corresponding relay node is disconnected. This allows the member node and other member nodes it originally served to immediately switch to using other member nodes as relay nodes, thus avoiding the situation of not being able to obtain relevant data from the mesh network for a long period of time and maintaining the performance of the tree network topology.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for updating a network topology, executed by a control node of a plurality of network nodes, comprising:

establishing a tree network topology comprising the network nodes;

obtaining a signal scan result of each of the network nodes, wherein the signal scan result of the each of the network nodes indicates a signal quality indicator of at least one other network node; and updating the tree network topology based on the signal scan result of the each of the network nodes.

2. The method according to claim 1, wherein the network nodes comprise the control node and at least one member node.

3. The method according to claim 2, wherein each member node is directly connected to the control node in the tree network topology, or indirectly connected to the control node through other member nodes, wherein the control node obtains the signal scan result of the each member node directly or indirectly through the tree network topology.

4. The method according to claim 2, wherein updating the tree network topology based on the signal scan result of the each of the network nodes comprises:

in response to determining that the signal scan result of the control node indicates that at least one first member node and at least one second member node exist in the at least one member node, updating the tree network topology by controlling each first member node to directly connect to the control node, wherein the signal quality indicator of the each first member node in the signal scan result of the control node satisfies a first preset condition, and the signal quality indicator of the each second member node in the signal scan result of the control node does not satisfy the first preset condition;

marking the at least one first member node as belonging to at least one updated node, and marking the at least one second member node as belonging to at least one non-updated node.

5. The method according to claim 4, wherein updating the tree network topology based on the signal scan result of the each of the network nodes comprises:

(a) in an $i^{th}$ stage, obtaining at least one first reference node marked as belonging to the at least one updated node in an $i-1^{th}$ stage, wherein i is an index value greater than or equal to 1;

(b) determining whether the signal scan result of each first reference node indicates that at least one third member node exists in the at least one non-updated node, wherein the signal quality indicator in the signal scan result of each third member node in each corresponding first reference node satisfies the first preset condition;

(c) in response to determining that the signal scan result of the each first reference node indicates that the at least one third member node exists in the at least one non-updated node, executing:

updating the tree network topology by controlling the each third member node to directly connect to the each corresponding first reference node;

marking the at least one third member node as belonging to the at least one updated node; and increasing i by 1 and returning to step (a).

6. The method according to claim 5, wherein in response to determining that the signal scan result of the each first reference node indicates that there is no third member node exists in the at least one non-updated node, the method further comprises:

(d) in the $i^{th}$ stage, finding at least one second reference node in the at least one non-updated node, wherein the signal scan result of each second reference node comprises at least one fourth member node belonging to the at least one updated node;

(e) updating the tree network topology by controlling the each second reference node to directly connect to the corresponding at least one fourth member node;

(f) marking the each second reference node as belonging to the at least one updated node, increasing i by 1, and returning to step (d); and (g) executing repeatedly (d) to (f) until each member node is marked as belonging to the at least one updated node.

7. The method according to claim 5, wherein when i is 1, obtaining the at least one first reference node marked as belonging to the at least one updated node in the $i-1^{th}$ stage comprises:

determining the at least one first member node as the at least one first reference node.

8. The method according to claim 2, wherein the tree network topology belongs to a multi-hop wireless network, and each member node is connected to an external network only through the control node.

9. The method according to claim 2, wherein the control node is a multipoint relay, and each member node is a mesh access point.

10. The method according to claim 1, wherein the control node is predefined or determined by the network nodes through a competition mechanism.

11. The method according to claim 2, wherein the at least one member node comprises at least one updated node and at least one non-updated node, and updating the tree network topology based on the signal scan result of the each of the network nodes comprises:

in response to determining that the at least one non-updated node only comprises at least one remote node that is not located within a signal transmission range of any updated node, repeatedly executing the following operations until each member node is marked as belonging to the at least one updated node, and the operations comprising:

finding at least one second reference node in the at least one non-updated node, wherein the signal scan result of each second reference node comprises at least one fourth member node belonging to the at least one updated node, and the signal transmission range corresponds to a preset strength threshold;

updating the tree network topology by controlling the each second reference node to directly connect to the corresponding at least one fourth member node;

marking the each second reference node as belonging to the at least one updated node.

12. A control node, comprising:

a storage circuit, storing a program code; and a processor, coupled to the storage circuit and accessing the program code to:

establish a tree network topology comprising a plurality of network nodes;

obtain a signal scan result of each of the network nodes, wherein the signal scan result of the each of the network nodes indicates a signal quality indicator of at least one other network node; and update the tree network topology based on the signal scan result of the each of the network nodes.

13. The control node as described in claim 12, wherein the network nodes comprise the control node and at least one member node.

14. The control node according to claim 13, wherein the processor executes:

in response to determining that the signal scan result of the control node indicates that at least one first member node and at least one second member node exist in the at least one member node, updating the tree network topology by controlling each first member node to directly connect to the control node, wherein the signal quality indicator of the each first member node in the signal scan result of the control node satisfies a first preset condition, and the signal quality indicator of the each second member node in the signal scan result of the control node does not satisfy the first preset condition;

marking the at least one first member node as belonging to at least one updated node, and marking the at least one second member node as belonging to at least one non-updated node.

15. The control node according to claim 13, wherein the processor executes:

(a) in an ith stage, obtaining at least one first reference node marked as belonging to the at least one updated node in an i−1th stage, wherein i is an index value greater than or equal to 1;

(b) determining whether the signal scan result of each first reference node indicates that at least one third member node exists in the at least one non-updated node, wherein the signal quality indicator in the signal scan result of each third member node in each corresponding first reference node satisfies the first preset condition;

(c) in response to determining that the signal scan result of the each first reference node indicates that the at least one third member node exists in the at least one non-updated node, executing:

updating the tree network topology by controlling the each third member node to directly connect to the each corresponding first reference node;

marking the at least one third member node as belonging to the at least one updated node; and increasing i by 1 and returning to step (a).

16. The control node according to claim 15, wherein in response to determining that the signal scan result of the each first reference node indicates that there is no third member node exists in the at least one non-updated node, the processor further executes:

(d) in the ith stage, finding at least one second reference node in the at least one non-updated node, wherein the signal scan result of each second reference node comprises at least one fourth member node belonging to the at least one updated node;

(e) updating the tree network topology by controlling the each second reference node to directly connect to the corresponding at least one fourth member node;

(f) marking the each second reference node as belonging to the at least one updated node, increasing i by 1, and returning to step (d); and (g) executing repeatedly (d) to (f) until each member node is marked as belonging to the at least one updated node.

17. The control node according to claim 15, wherein when i is 1, the processor executes:

determining the at least one first member node as the at least one first reference node.

18. The control node according to claim 13, wherein the tree network topology belongs to a multi-hop wireless network, and each member node is connected to an external network only through the control node.

19. The control node according to claim 13, wherein the control node is a multipoint relay, and each member node is a mesh access point.

20. The control node as described in claim 13, wherein the at least one member node comprises at least one updated node and at least one non-updated node, and the processor executes:

in response to determining that the at least one non-updated node only comprises at least one remote node that is not located within a signal transmission range of any updated node, repeatedly executing the following operations until each member node is marked as belonging to the at least one updated node, and the operations comprising:

finding at least one second reference node in the at least one non-updated node, wherein the signal scan result of each second reference node comprises at least one fourth member node belonging to the at least one updated node, and the signal transmission range corresponds to a preset strength threshold;

updating the tree network topology by controlling the each second reference node to directly connect to the corresponding at least one fourth member node;

marking the each second reference node as belonging to the at least one updated node.

* * * * *